Figure 1:
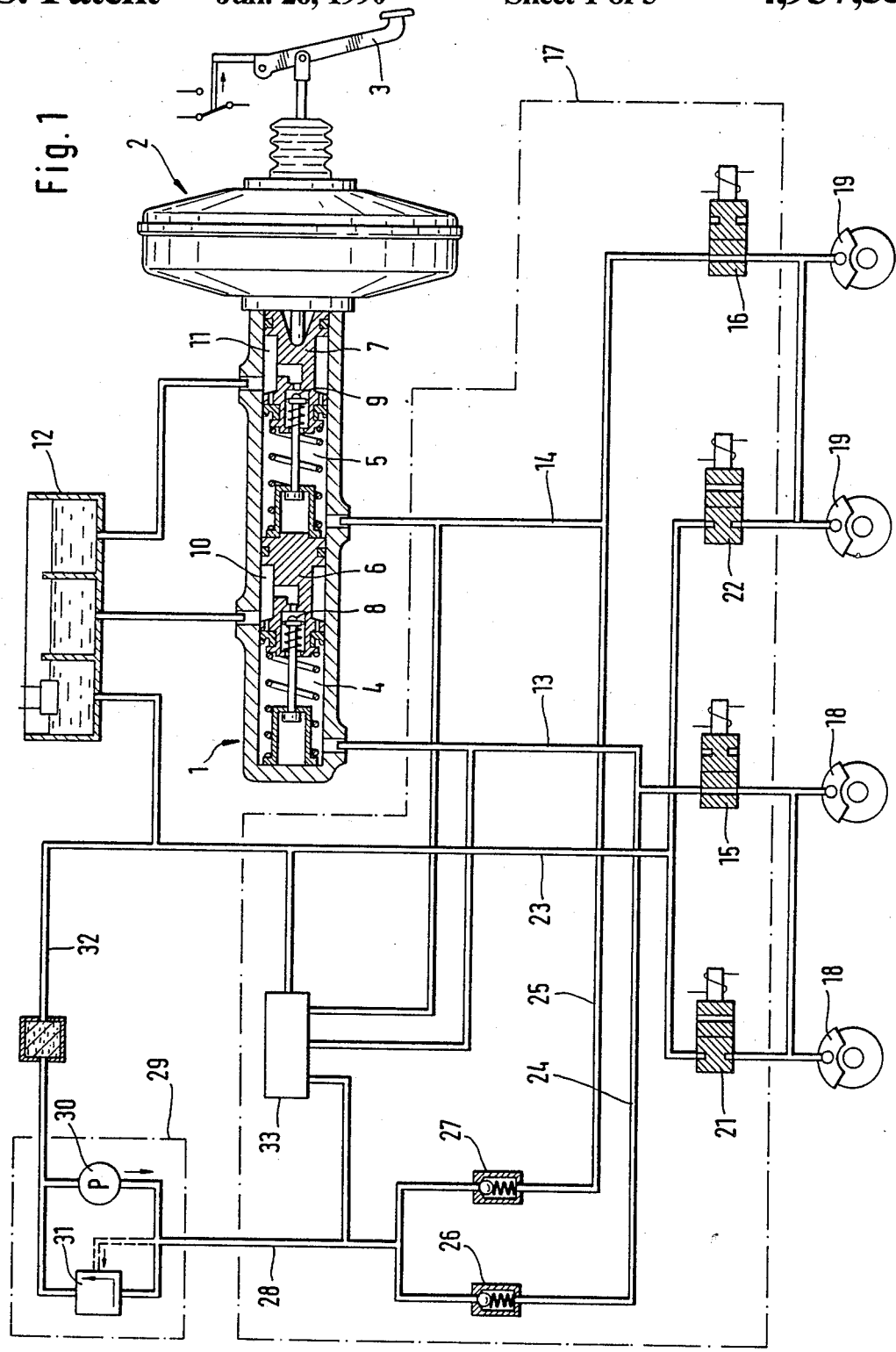

United States Patent [19]

Juckenack

[11] Patent Number: 4,937,553
[45] Date of Patent: Jun. 26, 1990

[54] ELECTROHYDRAULIC DEVICE FOR CONTINUOUSLY MONITORING THE PRESSURE IN A HYDRAULIC BRAKE SYSTEM FOR AUTOMOTIVE VEHICLES

[75] Inventor: Dietrich Juckenack, Bad Homburg, Fed. Rep. of Germany

[73] Assignee: Alfred Teves GmbH, Frankfurt am Main, Fed. Rep. of Germany

[21] Appl. No.: 230,833

[22] PCT Filed: Oct. 17, 1987

[86] PCT No.: PCT/EP87/00612
    § 371 Date: Jul. 14, 1988
    § 102(e) Date: Jul. 14, 1988

[87] PCT Pub. No.: WO88/03491
    PCT Pub. Date: May 19, 1988

[30] Foreign Application Priority Data

Nov. 14, 1986 [DE] Fed. Rep. of Germany ....... 3638978

[51] Int. Cl.$^5$ ............................................. B60Q 1/00
[52] U.S. Cl. ..................................... 340/452; 73/728; 336/30
[58] Field of Search ................. 340/452, 626; 73/728, 73/722, 715, DIG. 2; 336/30, 20; 188/1.11

[56] References Cited

U.S. PATENT DOCUMENTS 4,581,914 4/1986 Obermann et al. .................. 73/728
4,696,192 9/1987 Yamashita et al. .................. 73/728

FOREIGN PATENT DOCUMENTS 57-111427 7/1982 Japan .

Primary Examiner—Joseph A. Orsino
Assistant Examiner—Jeffery A. Hofsass
Attorney, Agent, or Firm—Robert P. Seitter

[57] ABSTRACT

An electrohydraulic device is suggested for continuously monitoring the pressure in a hydraulic brake system for automotive vehicles, in particular for outputting electric control signals in dependence upon applied pressure signals, the said device being composed of a housing containing two coaxial bores, a receiver arranged in the housing and applicable by the inlet pressure, as well as a converter for converting the hydraulic pressure into an electric output signal.

To devise a structurally simple, reliable device of cost-efficient manufacture, the instant invention provides that the receiver is formed of a membrane made of amorphous metal with changing permeability which coacts with a coil system used as a converter, the output signals of which can be supplied to an evaluating electronic system.

10 Claims, 3 Drawing Sheets

ELECTROHYDRAULIC DEVICE FOR CONTINUOUSLY MONITORING THE PRESSURE IN A HYDRAULIC BRAKE SYSTEM FOR AUTOMOTIVE VEHICLES

The instant invention relates to an electrohydraulic device for continuously monitoring the pressure in a hydraulic brake system for automotive vehicles, in particular for outputting electric control signals in dependence upon applied pressure signals, the said device being composed of a housing having two coaxial bores, a receiver arranged in the housing and applicable by the inlet pressure, as well as a converter for converting the hydraulic pressure into an electric output signal.

For governing and monitoring the pressure of a hydraulic brake system, it is already known to use a pressure and alarm switch which permits to transmit the hydraulic pressure via an axially displaceable piston onto mechanically actuatable customary microswitches.

In this arrangement, it is prevented by sealedly accommodating the piston within the housing that the pressure-transmitting medium acting upon an end surface of the piston gets into contact with the mechanic microswitches. This way, sufficient useful life and/or resistance of the pressure and alarm switch to aging is accomplished even when chemically aggressive pressure-transmitting media are used. However, such microswitches are relatively complicated, and sealing a displaceable piston which is applied by a pressure-transmitting medium subject to high pressure entails difficulties in principle.

Therefore, it is an object of the present invention to overcome this shortcoming and to develop a device for monitoring the pressure in a hydraulic brake system which is characterized above all by simple design, long useful life, great reliability and little expenditure in manufacture. Furthermore, sufficient response sensitivity and precise reaction to pressure variations are demanded.

It has proved now that this object can be achieved in a simple, yet technically progressive manner by improving upon a device of the type initially referred to in a way such that the receiver is formed of a membrane of amorphous metal with changing permeability that cooperates with a coil system used as a converter, the output signals of which can be supplied to an evaluating electronic system. Owing to the use of amorphous metal, a cost-effective and efficient solution is achieved which has three major advantages:

(a) very great mechanical strength (static and dynamic) of the receiver;
(b) soft magnetic behaviour; that means narrow hysteresis and the possibility of 'adjustment' of the hysteresis shape by variation of the alloy compositions of the amorphous metal and by heat treatment methods;
(c) great resolution of the receiver so that even very minor pressure variations can be sensed.

A particularly effective improvement of the inventive subject matter provides that the membrane is abutting on an end surface of a partition wall isolating the first bore from the second bore and is clamped in its fringe area by means of a setscrew, the said partition wall comprising an axial recess and the coil system being arranged in the second bore.

According to a further advantageous feature of this invention, the membrane is of circular design, what accomplishes a particularly simple sealing attachment.

In order to augment the sensitivity of the electrohydraulic device according to this invention, the membrane is of rectangular shape, and it is located such that its longitudinal axis extends normal to the longitudinal axis of the coil system.

A particularly space-saving arrangement of the inventive device will be achieved in that in the second bore, there is provision of a cylindrical partition wall extending in parallel to said bore's wall and subdividing the second bore into an annular chamber and an inside chamber, the coil system being placed in the annular chamber, whilst the inside chamber is destined to accommodate the evaluating electronic system.

Further details and advantages of the inventive device will become more apparent from the subclaims as well as from the description of two embodiments of this invention which hereinbelow will be explained in more detail with reference to the accompanying drawings, wherein parts corresponding to each other have been assigned like reference numerals.

Figure 2:
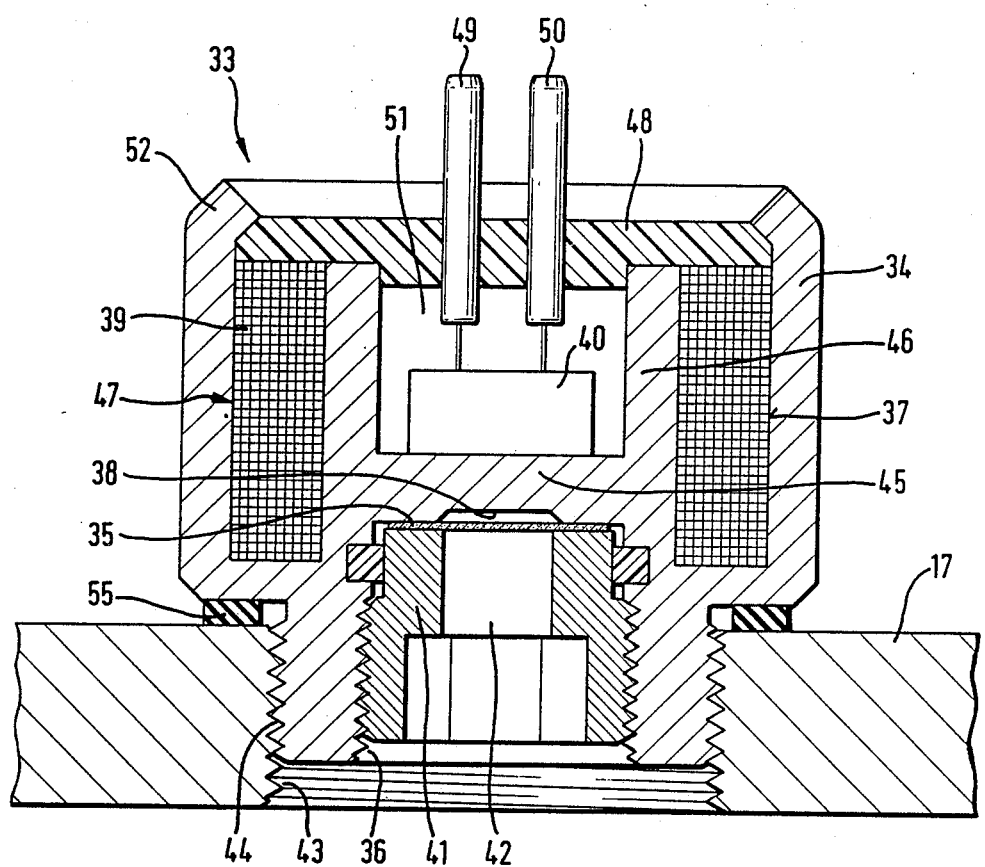
Figure 3:
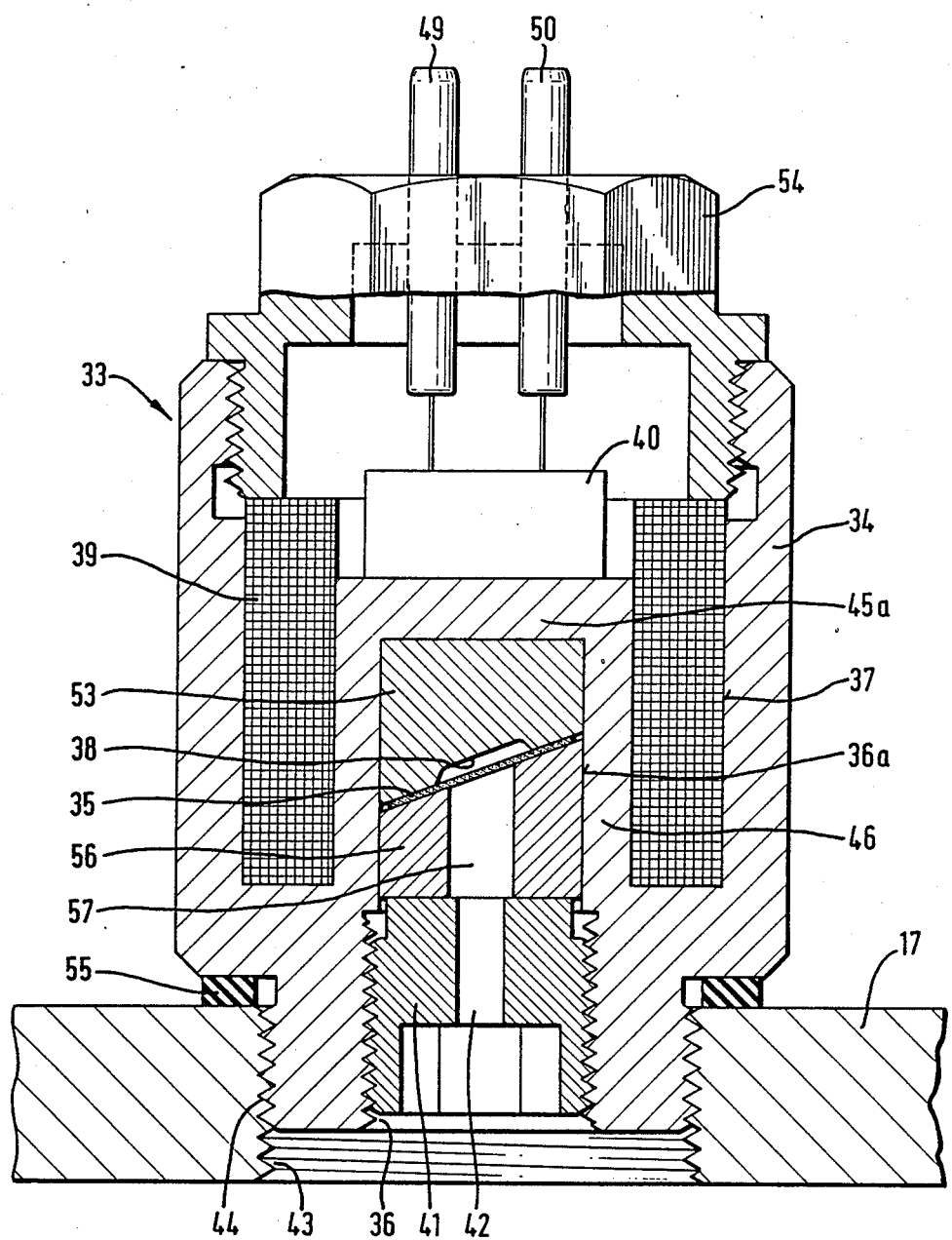

The drawings display in a schematically simplified view:

FIG. 1 a circuit diagram of a dual-circuit hydraulic brake system for an automotive vehicle with a partial longitudinal cross-section through a braking pressure generator, FIG. 2 a longitudinal cross-sectional view of a first embodiment of the inventive device, FIG. 3 a longitudinal cross-sectional view of a further embodiment of the inventive device.

The braking pressure generator illustrated in FIG. 1 is composed of a tandem master brake cylinder 1 and a vacuum brake power booster 2 actuatable by a brake pedal 3.

The tandem master brake cylinder 1 illustrated in cross-section comprises two separate working chambers 4, 5 which can be diminished by an actuating stroke of the master cylinder pistons 6, 7. Via central valves 8, 9 which are open in their illustrated initial position, the working chambers 4, 5 are connectible with supply chambers 10, 11 which communicate with an unpressurized supply reservoir 12.

Brake lines 13, 14 of two brake circuits lead from the working chambers 4, 5 of the tandem master brake cylinder 1 to solenoid valves 15, 16, open in their de-energized state, of a brake slip control apparatus not referred to in more detail that is arranged in a valve block 17. Connected to the solenoid valves 15, 16 are two wheel brakes 18 and/or 19 each, one of these being in each case allocated to a front wheel of a motor vehicle, while the other one is allocated to a rear wheel of this vehicle disposed diagonally to the front wheel. Hence, a dual-circuit brake system with diagonal circuit allotment is concerned.

Further, the wheel brakes 18 and 19 are connected to two solenoid valves 21, 22 of the valve block 17 which are closed in their de-energized state and the inlet side of which connects via a return line 23 with the supply reservoir 12. A pressure line 24, 25 branches off from each brake line 13, 14. Each pressure line 24, 25 leads to a separate non-return valve 26, 27 which is closed in its initial position and which is likewise accommodated in the valve block 17. The non-return valves 26, 27 are arranged such as to open towards the pressure lines 24, 25 only. From the non-return valves 26, 27, a pressure line 28 leads to a pump unit 29 which is composed of an electromotively driven pump 30 and a pressure-relief valve 31 and which communicates via a suction line 32 with the reservoir 12.

In order to monitor the hydraulic pressure in the pressure line 28 of the pump unit 29, there is provision of an electrohydraulic device 33 which is likewise incorporated in the valve block 17 and which is connected to the pressure line 28, the brake lines 13, 14 and the return line 23.

The design of this electrohydraulic device 33 which is essential for the present invention is explained in connection with FIGS. 2 and 3.

In the drawing, reference numeral 34 designates a housing of the electrohydraulic device 33 which is screwed into a bore 43 of the valve block 17 mentioned with regard to FIG. 1. This screw coupling with the valve block 17 is rendered possible by means of an external thread 44 which is shaped on the housing 34. Housing 34 is furnished with two coaxial bores 36 and 37 which are isolated from each other by a partition wall 45 extending perpendicular to the longitudinal axis of the housing 34, with bore 37 having a larger diameter. In order to prevent leakage of the hydraulic pressure medium, which is due to the clearance existing between the external thread 44 and the internal thread of the wall of bore 41, there is provision of a ring seal 55 which is clamped in between the surface of valve block 17 and the housing 34.

In bore 36 confined by the partition wall 45, there is arranged perpendicularly to said bore's longitudinal axis a membrane 35 of amorphous metal which is in sealing abutment on the partition wall 45 and which is pressed in its fringe area thereagainst by means of a setscrew 41 with internal hexagon that is screwed into the bore 36. In order to be able to apply on the membrane 35 the hydraulic pressure prevailing in the brake system, the setscrew 41 contains an axial passage 42, while the partition wall 45 includes an axial recess 38 which permits bulging of the membrane 35 under the effect of the hydraulic pressure.

Extending in the second bore 37 of larger diameter in parallel to said's wall is a cylindrical partition wall 46 which subdivides the interior of the second bore 37 into a radially outwardly disposed annular chamber 47 and an inwardly disposed inside chamber 51. The annular chamber 47 houses a stationary coil system 39 that is formed of a transmitter coil and a receiver coil which, however, are not shown in more detail in the Figures and are component parts of a bridge circuit. In the embodiment, the arrangement of the membrane 35 is preferably chosen such that the plane containing the membrane 35 extends perpendicular to the longitudinal axis of the coil system 39 and, simultaneously, represents a sectional plane of the circular-cylindrical coil system 39. In respect of optimally exploiting all space available in the housing 34, the inside chamber 51 accommodates an evaluating electronic system 40 which, except for the generator feeding the transmitter coil with most various shapes of excitation (sine, triangle, saw-tooth, rectangle shape etc.), contains all elements required for evaluating the pressure-responsive output signal of the coil system 39. The evaluating electronic system 40, in turn, is in connection with e.g. two contact pins 49, 50, illustrated only schematically, which serve to process the electric signals further. These contact pins 49, 50 which, for instance, can be designed as contact blades for a counter-plug extend through a contact pin board 48 closing the housing 34 and being held at said's end by way of a beaded joint 52.

In the embodiment of the inventive device shown in FIG. 3, the membrane 35 lies in a plane which extends transversely to the longitudinal axis of the coil system 39 and represents said's sectional plane at the same time. This membrane 35 is clamped in between two pressure members 53, 56 which are arranged in an axial extension 36a of the first bore 36 that is bounded by a radial partition wall 45a in axial direction. The axial recess 38 mentioned in respect with FIG. 2 is designed in the pressure member 53 facing the radial partition wall 45a in this design, while the other pressure member 56 contains an axial channel 57 which extends coaxially relative to the passage 42 of the setscrew 41 and permits flow of the hydraulic pressure fluid to the membrane 35. The evaluating electronic system 40 coacting with the coil system 39 is disposed on the frontal end of the radial partition wall 45a that is remote from the pressure member 53 and, as becomes apparent from FIG. 3, can project into an axial extension of a threaded plug 54 which closes the housing 34 of the electrohydraulic device. Similar to as is the case in the embodiment shown in FIG. 2, the threaded plug 54 may have contact pins 49, 50.

The mode of effect of the above-described electrohydraulic device according to the invention is as follows:

In the inactive position of the device (unpressurized condition of the hydraulic brake system), the membrane 35 made of any suitable amorphous metal adopts the position to be seen from FIGS. 2 and 3. When the hydraulic pressure prevailing in the brake system is increased, the membrane 35 is bulged out in the direction of the recess 38 by the action of the pressure fluid. In consequence thereof, there occurs a change in permeability due to magnetostriction of the amorphous metal that generates an ,inductive disturbance, from the transmitter coil to the receiver coil in the stationary coil system 39 which is transformed in the evaluating electronic system 40 into an analog, pressure-responsive continuous output information that will undergo further processing in an electronic control unit forming a component part of the brake slip control apparatus referred to in respect of FIG. 1. When the pressure applied on the membrane 35 decreases, the latter will return to its initial position due to its self-elasticity.

We claim:

1. An electrohydraulic device for continuously monitoring the pressure in a hydraulic brake system for automotive vehicles, in particular for outputting electric control signals in dependence upon applied pressure signals, the device being composed of a housing having first and second coaxial bores hydraulically isolated from each other by a partition wall, a receiver arranged in the housing and actuable in response to inlet pressure in said first bore, as well as a converter for converting the hydraulic pressure into an electric output signal.

characterized in that the receiver is formed of a membrane of amorphous metal with changing permeability that cooperates with a coil system used as the converter, the output signals of which can be supplied to an evaluating electronic system, a set screw sealingly clamping the periphery of said membrane against said partition wall to extend across said first bore with one side of said membrane exposed to inlet pressure in said first bore, means defining a recess at the opposite side of said membrane accommodating flexing of said membrane, and said coil system being located in said second bore.

2. An electrohydraulic device as claimed in claim 1, characterized in that the membrane is clamped in between two pressure members which are opposingly placed in an axial extension of the first bore, with the pressure member facing the setscrew being provided with an axial channel and the opposite pressure member being provided with said recess.

3. An electrohydraulic device as claimed in claim 2, characterized in that the membrane is arranged in a plane disposed transversely to the longitudinal axis of the coil system.

4. An electrohydraulic device as claimed in claim 2, characterized in that the axial extension of the first bore is confined by a cylindrical portion as well as a radial portion of the partition wall, and at the end surface of the radial portion which is remote from the membrane, the evaluating electronic system is arranged.

5. An electrohydraulic device as claimed in claim 4, characterized in that the coil system is placed outside of the cylindrical portion of the partition wall in the second bore.

6. An electrohydraulic device as claimed in claim 1, characterized in that the membrane is arranged in a plane disposed normal to the longitudinal axis of the coil system.

7. An electrohydraulic device as claimed in claim 2, characterized in that in the second bore, there is provision of a cylindrical partition wall and subdividing the second bore into an annular chamber and an inside chamber.

8. An electrohydraulic device as claimed in claim 7, characterized in that the coil system is placed in the annular chamber, whilst the inside chamber is destined to accommodate the evaluating electronic system.

9. An electrohydraulic device as claimed in claim 2, characterized in that hydraulic fluid is supplied to the membrane via a passage axially extending in the setscrew.

10. An electrohydraulic device as defined in claim 1 wherein said membrane lies in a plane which intersects said coil system.

* * * * *